United States Patent
Bae

(10) Patent No.: US 9,766,067 B2
(45) Date of Patent: Sep. 19, 2017

(54) METHOD OF ACQUIRING HORIZONTAL DISTANCE BETWEEN CAMERA AND TARGET, AND CAMERA AND SURVEILLANCE SYSTEM ADOPTING THE METHOD

(71) Applicant: HANWHA TECHWIN CO., LTD., Changwon-si (KR)

(72) Inventor: Soon-Min Bae, Changwon (KR)

(73) Assignee: Hanwha Techwin Co., Ltd., Changwon-Si (KR)

( * ) Notice: Subject to any disclaimer, the term of this patent is extended or adjusted under 35 U.S.C. 154(b) by 403 days.

(21) Appl. No.: 13/919,116

(22) Filed: Jun. 17, 2013

(65) Prior Publication Data
US 2014/0152810 A1 Jun. 5, 2014

(30) Foreign Application Priority Data
Dec. 3, 2012 (KR) .......................... 10-2012-0139260

(51) Int. Cl.
*G01C 11/02* (2006.01)
*G01C 3/12* (2006.01)

(52) U.S. Cl.
CPC .............. *G01C 3/12* (2013.01); *G01C 11/025* (2013.01)

(58) Field of Classification Search
CPC ................................ G01C 3/12; G01C 11/025
USPC ......................................................... 348/135
See application file for complete search history.

(56) References Cited

U.S. PATENT DOCUMENTS

| | | | |
|---|---|---|---|
| 8,164,628 B2 | 4/2012 | Stein et al. | |
| 2001/0010542 A1* | 8/2001 | Takagi et al. | ................. 348/152 |
| 2004/0054473 A1* | 3/2004 | Shimomura | .......... G01S 3/7865 |
| | | | 701/301 |
| 2011/0211059 A1 | 9/2011 | Smith et al. | |

(Continued)

FOREIGN PATENT DOCUMENTS

| | | |
|---|---|---|
| CN | 101408423 A | 4/2009 |
| CN | 101888537 A | 11/2010 |
| CN | 102575930 A | 7/2012 |

(Continued)

OTHER PUBLICATIONS

Communication dated Jan. 25, 2017 issued by the State Intellectual Property Office of P.R. China in counterpart Chinese Application No. 201310632626.X.

*Primary Examiner* — Gims Philippe
*Assistant Examiner* — On S Mung
(74) *Attorney, Agent, or Firm* — Sughrue Mion, PLLC

(57) ABSTRACT

Exemplary embodiments disclose a method of acquiring a horizontal distance between a camera and a target, which is a horizontal distance between a central point of an optical system of the camera and a ground landing point of the target. The method includes acquiring a relative target angle using an angle between a ground and a camera-target connection line which connects the central point of the optical system of the camera and the ground landing point of the target, acquiring a height of the camera using a height of the central point of the optical system of the camera on a basis of a vertical position of the ground landing point of the target, and setting a quotient of the height of the camera divided by a tangent value of the relative target angle as the horizontal distance between the camera and the target.

10 Claims, 10 Drawing Sheets

(56) References Cited

U.S. PATENT DOCUMENTS

2013/0271597 A1   10/2013   Kawamata et al.

FOREIGN PATENT DOCUMENTS

| | | |
|---|---|---|
| JP | 2002-323315 A | 11/2002 |
| JP | 2008-271378 A | 11/2008 |
| KR | 10-0324182 B1 | 2/2002 |
| KR | 10-2008-0079751 A | 9/2008 |

* cited by examiner

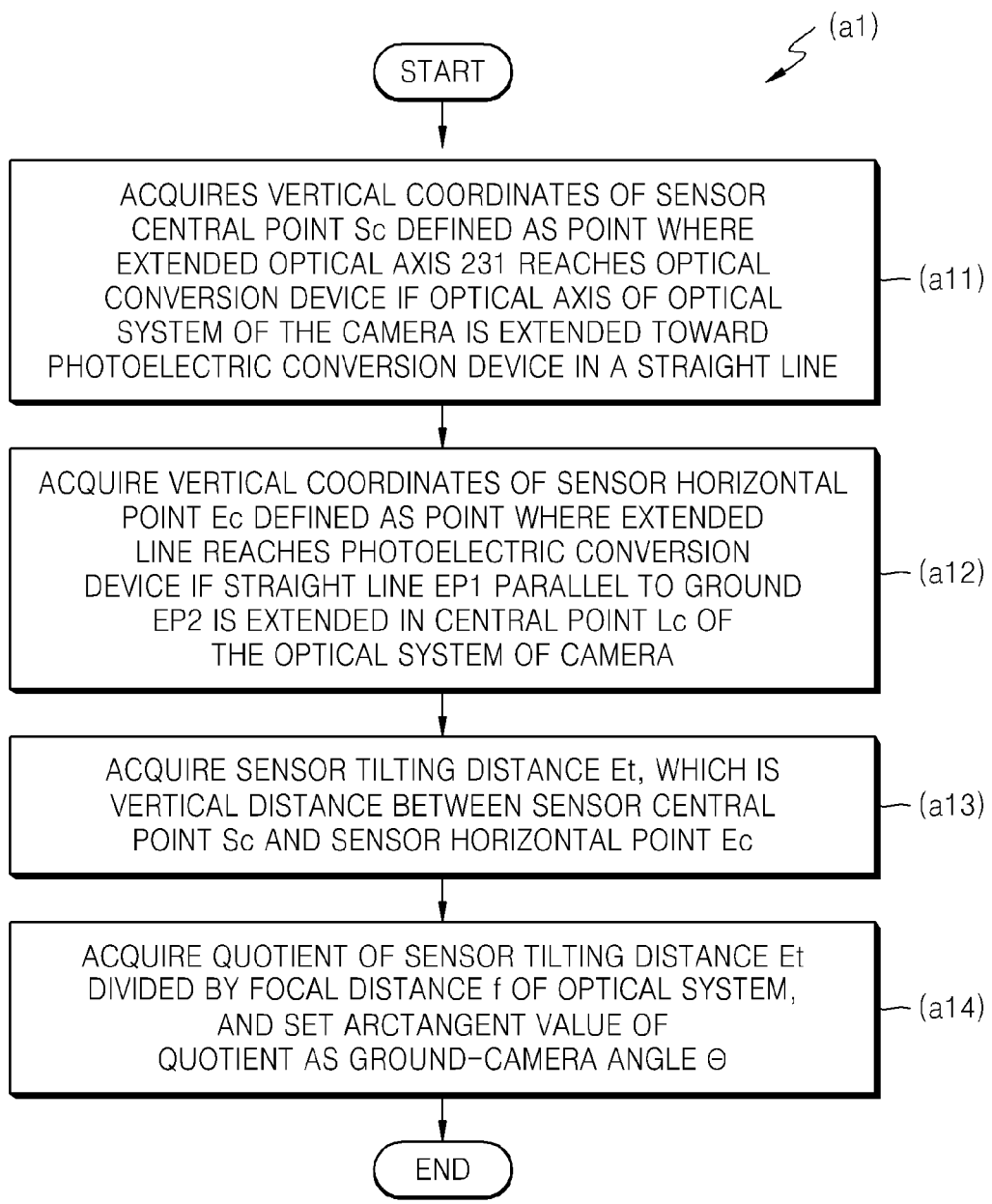

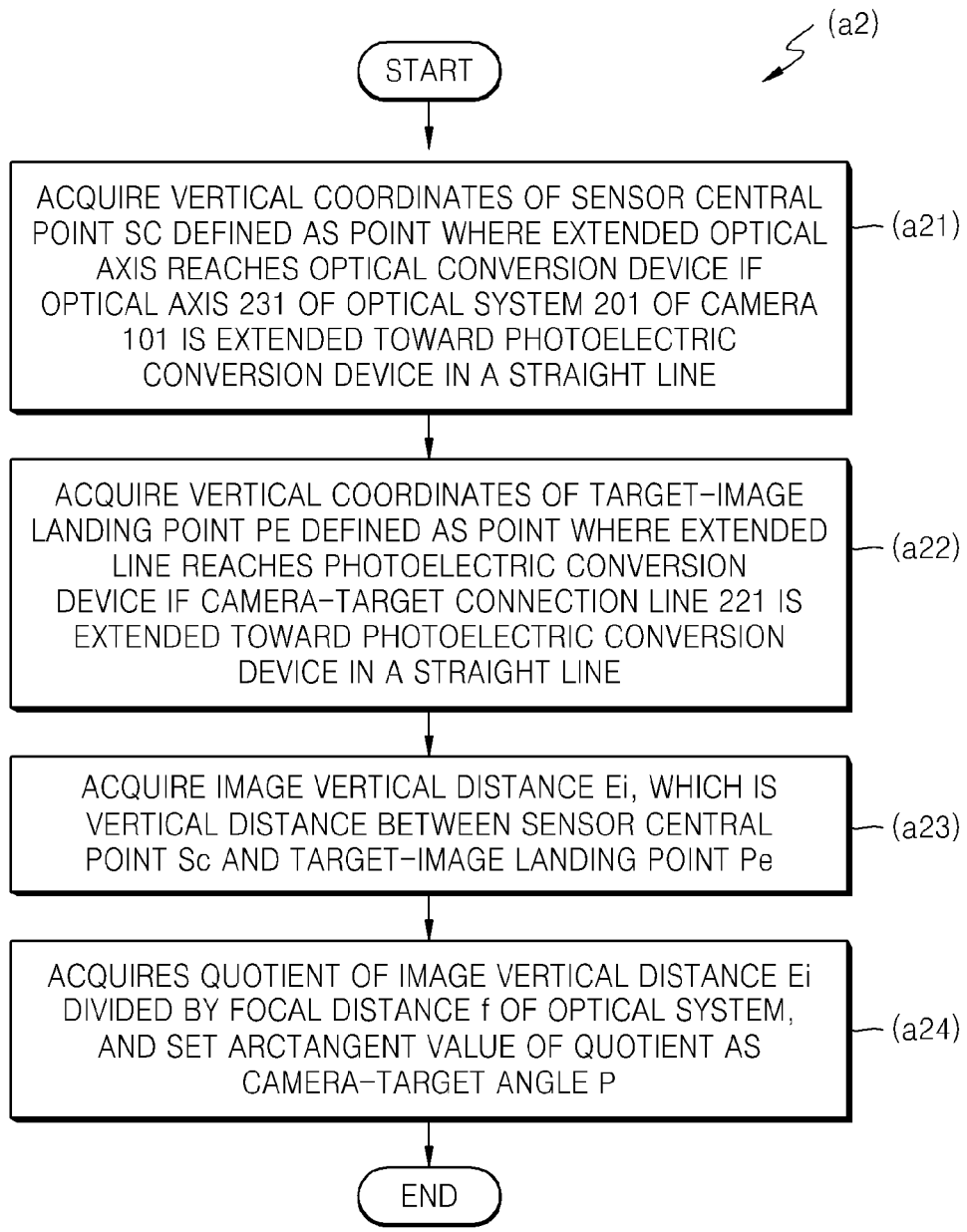

METHOD OF ACQUIRING HORIZONTAL DISTANCE BETWEEN CAMERA AND TARGET, AND CAMERA AND SURVEILLANCE SYSTEM ADOPTING THE METHOD

CROSS-REFERENCE TO RELATED PATENT APPLICATION

This application claims priority from Korean Patent Application No. 10-2012-0139260, filed on Dec. 3, 2012, in the Korean Intellectual Property Office, the disclosure of which is incorporated herein in its entirety by reference.

BACKGROUND

1. Field

Exemplary embodiments relate to a method of acquiring a horizontal distance between a camera and a target, and a camera and surveillance system using the method. In particularly, exemplary embodiments relate to a method of acquiring a horizontal distance between a central point of an optical system of a camera and a ground landing point of a target, and a camera and surveillance system adopting the method.

2. Description of the Related Art

In a related art, a host device of a camera or a surveillance system may need to acquire and display a distance between the camera and a target.

For example, in the related art, when the surveillance system is in operation and several cameras function simultaneously to trace a target, such as a person or a car, a distance between a camera that is currently photographing the target and the target, needs to be displayed.

In the related art, in order to acquire the distance between the camera and the target, a laser sensor or two or more adjacent cameras has been used.

In the related art, when a camera includes a laser sensor, the distance between the camera and the target is equal to the return speed of a laser beam, multiplied by the return time. However, this method of the related art has the following problems:

First, additional costs are generated in order to include a laser sensor in a camera.

Second, a straight line distance, not a horizontal distance, between the camera and the target is acquired. Thus, in the related art, it is difficult to know the horizontal distance between the camera and the target.

Further, a related art method of acquiring a distance between a camera and a target by using two or more adjacent cameras has the following problems:

First, only one camera in one area is used to take pictures of a target to obtain moving pictures thereof. Thus, the costs for the additional cameras are wasted.

Second, as images from two or more adjacent cameras are used, a method of calculating a distance between the camera and the target becomes complicated. In other words, an inaccurate result may be generated, due to calculation delay. For example, it may be difficult to accurately display in real time the distance between a car moving at a fast speed and a camera.

Accordingly, there is a need for a method of acquiring a horizontal distance between a central point of an optical system of a camera and a ground landing area of a target, and a camera and surveillance system adopting the method

SUMMARY

Exemplary embodiments relate to a method of quickly acquiring a horizontal distance between a camera and a target, and a camera and surveillance system adopting the method.

According to an aspect of the exemplary embodiments, there is provided a method of acquiring a horizontal distance between a camera and a target, which is a horizontal distance between a central point of an optical system of the camera and a ground landing point of the target, including: acquiring a relative target angle using an angle between a ground and a camera-target connection line which connects the central point of the optical system of the camera and the ground landing point of the target; acquiring a height of the camera using a height of the central point of the optical system of the camera on a basis of a vertical position of the ground landing point of the target; and setting a quotient of the height of the camera divided by a tangent value of the relative target angle as the horizontal distance between the camera and the target.

The acquiring the relative target angle comprises: acquiring a ground-camera angle using an angle between the ground and an optical axis of the optical system of the camera; acquiring a camera-target angle using an angle by which the camera-target connection line is placed away from the optical axis of the camera; and acquiring the relative target angle according to the ground-camera angle and the camera-target angle.

A tilting angle acquired in a tilting control of the camera may be set as the ground-camera angle.

If the ground-camera angle is 0 degree when the camera is parallel to the ground, the camera-target angle may be set as the relative target angle.

If the ground-camera angle includes the camera-target angle, the relative target angle may be equal to the ground-camera angle minus the camera-target angle.

If the camera-target angle includes the ground-camera angle, the relative target angle may be equal to the camera-target angle minus the ground-camera angle.

If the ground-camera angle does not include the camera-target angle, and the camera-target angle does not include the ground-camera angle, the relative target angle may be equal to the ground-camera angle minus the camera-target angle.

The camera may include a photoelectric conversion device corresponding to the optical system.

The acquiring the ground-camera angle may include: acquiring a vertical coordinate of a sensor central point, if the optical axis of the optical system of the camera is extended toward the photoelectric conversion device in a straight line, the sensor central point being a point where the extended optical axis reaches the photoelectric conversion device; acquiring a vertical coordinate of a sensor horizontal point, if a straight line parallel to the ground is extended from the central point of the optical system of the camera, the sensor horizontal point being a point where the extended line reaches the photoelectric conversion device; acquiring a sensor tilting distance, which is a vertical distance between the sensor central point and the sensor horizontal point; and acquiring a quotient of the sensor tilting device divided by a focal distance of the optical system, and setting an arctangent value of the quotient as the ground-camera angle.

The camera may include a photoelectric conversion device corresponding to the optical system.

The acquiring the camera-target angle may include: acquiring a vertical coordinate of a sensor central point, if the optical axis of the optical system of the camera is extended toward the photoelectric conversion device in a straight line, the sensor central point being a point where the extended optical axis reaches the photoelectric conversion device; acquiring a vertical coordinate of a target-image landing point, if the camera-target connection line is extended toward the photoelectric conversion device in a straight line, the target-image landing point being a point where an extended line reaches the photoelectric conversion device; acquiring an image vertical distance, which is a vertical distance between the sensor central point and the target-image landing point; and acquiring a quotient of the image vertical distance divided by a focal distance of the optical system, and setting an arctangent value of the quotient as the camera-target angle.

According to another aspect of the exemplary embodiments, there is provided a camera for acquiring a horizontal distance between the camera and a target, which is a horizontal distance between a central point of an optical system of the camera and a ground landing point. The camera uses a method of acquiring a horizontal distance between the camera and the target.

According to another aspect of the exemplary embodiments, there is provided a surveillance system including a camera connected to a host device, the host device acquiring a horizontal distance between the camera and a target, which is a horizontal distance between a central point of an optical system of the camera and a ground landing point of the target. The host device uses a method of acquiring a horizontal distance between the camera and the target.

BRIEF DESCRIPTION OF THE DRAWINGS

The above and other features and advantages of the exemplary embodiments will become more apparent by describing in detail exemplary embodiments thereof with reference to the attached drawings, in which:

FIG. 9 is a flowchart illustrating in detail step (a1) of FIG. 4, when a tilting angle of a camera is not promptly acquired; and FIG. 10 is a flowchart illustrating in detail step (a2) of FIG. 4.

DETAILED DESCRIPTION

The descriptions below and attached drawings are for understanding the operations according to the exemplary embodiments, and portions which may be easily implemented by those skilled in the art may be omitted from the descriptions.

Further, the present specification and drawings are not provided to limit the exemplary embodiments, and the scope of the exemplary embodiments should be determined by the claims. The terms used in the present specification should be understood as corresponding to the meaning and technical concept of the exemplary embodiments, such that the exemplary embodiments may be clearly and concisely expressed.

Hereinafter, the embodiments of the exemplary embodiments will be described in detail with reference to attached drawings.

Figure 1:
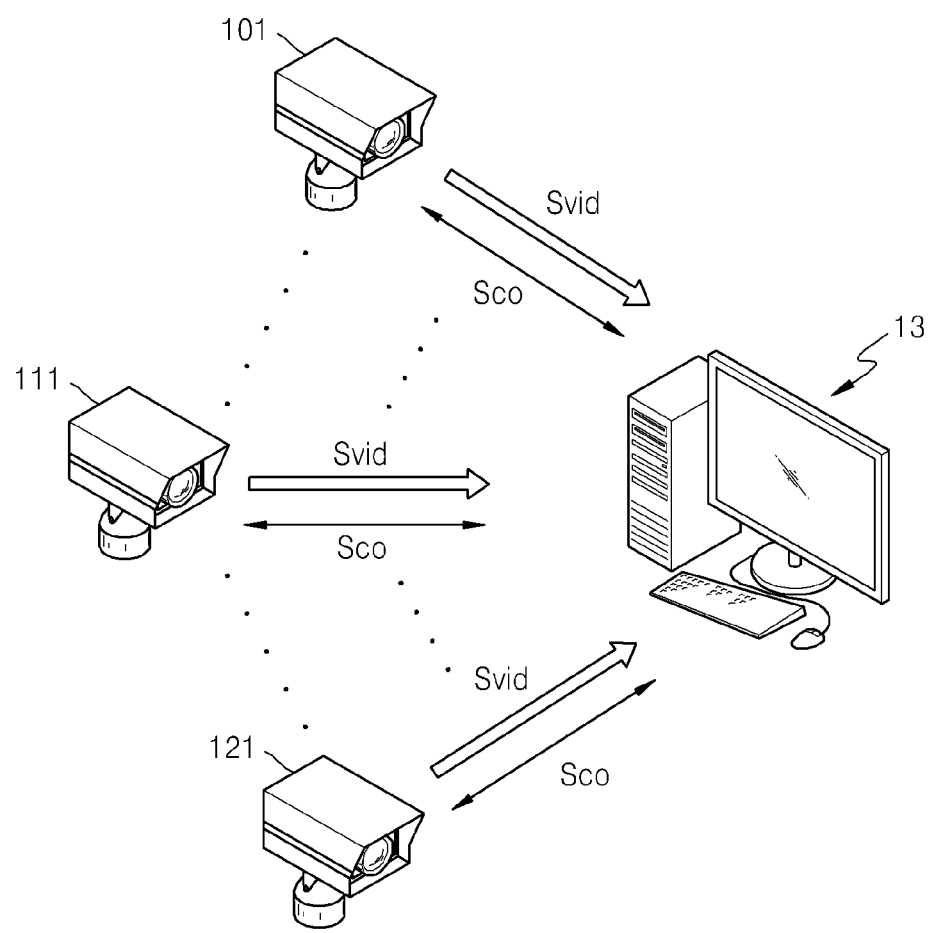
FIG. 1 is a view illustrating a camera surveillance system adopting a method according to an exemplary embodiment.

FIG. 1 is a view illustrating a camera surveillance system adopting a method according to an exemplary embodiment.

Referring to FIG. 1, cameras 101 to 121 transmit live-view video signals (Svid) to a host device 13, while exchanging communication signals (Sco) and communicating with the host device 13.

For example, each of the cameras 101 to 121 transmits video signals (Svid) to the host device 13, while communicating with the host device 13 through a coaxial cable. Therefore, communication signals (Dcom) are transmitted and received in a vertical blank interval of the video signals (Svid) transmitted to the host device 13.

The video signals (Svid) received by the host device 13 are displayed on a display device, and are stored in a recording device, such as a hard disk drive.

Further, each of the cameras 101 to 121 perform a horizontal rotation (panning) and a vertical rotation (tilting), in response to control signals received from the host device 13.

The method, according to an exemplary embodiment, may be performed by each of the cameras 101 and 121, or by the host device 13. In other words, each camera 101 to 121, or the host device 13, may acquire a horizontal distance between the central point of the optical system of each camera 101 to 121, and a ground landing point of the target. Hereinafter, this horizontal distance will simply be referred to as the horizontal distance between the camera and the target.

The method will be described in detail with reference to FIGS. 2 to 10.

Figure 2:
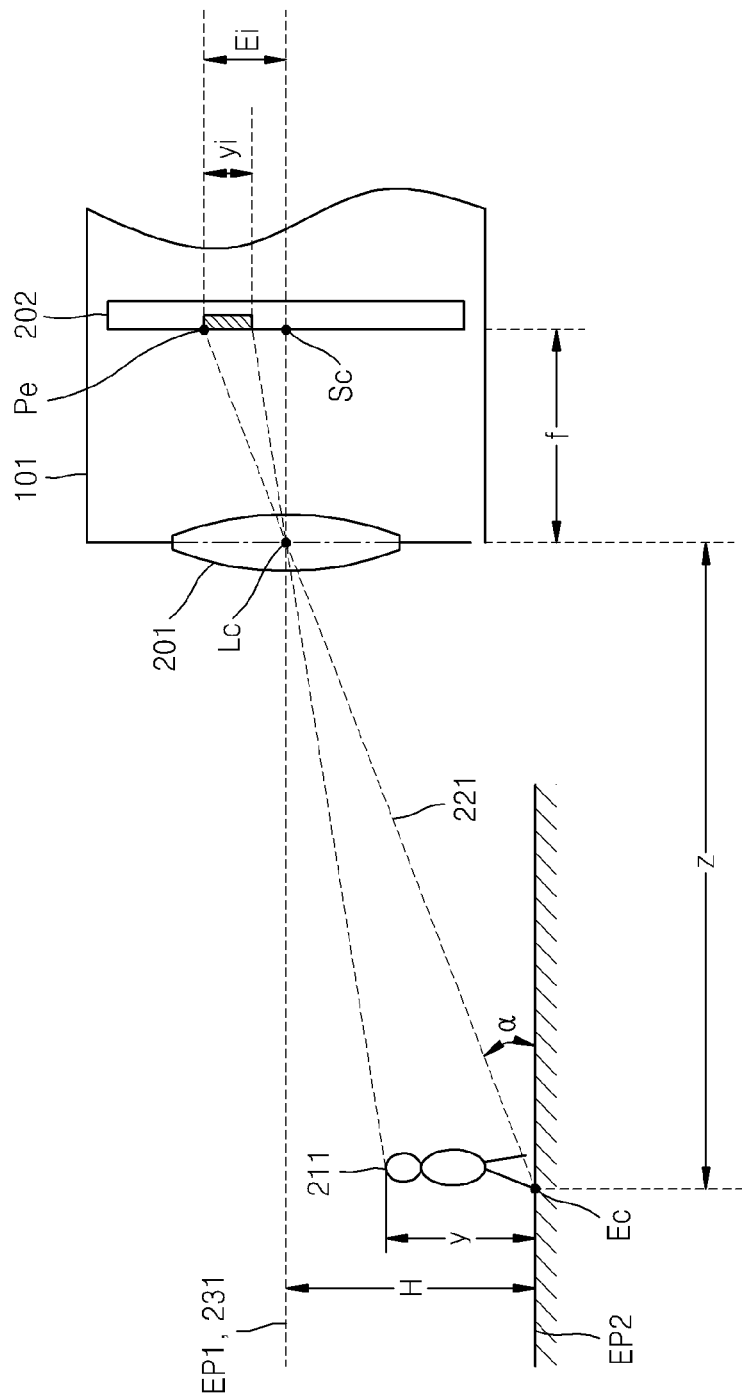
FIG. 2 is a first view illustrating a method according to an exemplary embodiment.

FIG. 2 is a first view illustrating a method according to an exemplary embodiment. In FIG. 2, reference numeral 101 denotes a camera, reference numeral 201 denotes an optical system, reference numeral 202 denotes a photoelectric conversion device, reference numeral 211 denotes a target, reference numeral 221 denotes a camera-target connection line, reference numeral 231 denotes an optical axis of an optical system, a denotes a relative target angle, Ec denotes a ground landing point, Ei denotes an image vertical distance, EP1 denotes a ground-parallel straight line, EP2 denotes a ground, f denotes a focal distance, H denotes a camera height, Lc is a central point of an optical system, Pe denotes a target-image landing point, Sc denotes a sensor central point, y denotes a target vertical length, yi denotes a target-image vertical length, and z denotes a horizontal distance between a camera and a target.

The first view of FIG. 2 shows a case in which the optical axis 231, of the optical system 201, is parallel to ground (EP2). In this case, if the horizon is photographed, the image of the horizon is positioned on the horizontal line of the sensor central point (Sc), and Equation 1 below represents that:

$$y:yi=z:f \quad \text{[Equation 1]}$$

The horizontal distance z between the camera 101 and the target 211 may be calculated according to Equation 2 below:

$$z = \frac{ys^f}{yi} \quad \text{[Equation 2]}$$

In Equation 2, S denotes a multiplication sign.

However, as illustrated in the first view of FIG. 2, Equation 2 may be applied only in the case where the optical axis 231 of the optical system 201 is parallel to the ground EP2, i.e., when the angle between the optical axis 231 of the optical system 201 and the ground EP2 is 0O. If Equation 2 is applied in other situations, an error is generated in proportion to the angle between the optical axis 231 of the optical system 201 and the ground EP2.

Hence, the embodiment provides a distance calculation method which does not generate a distance error, due to an angle between the optical axis 231 of the optical system 201 and the ground EP2.

Figure 3:
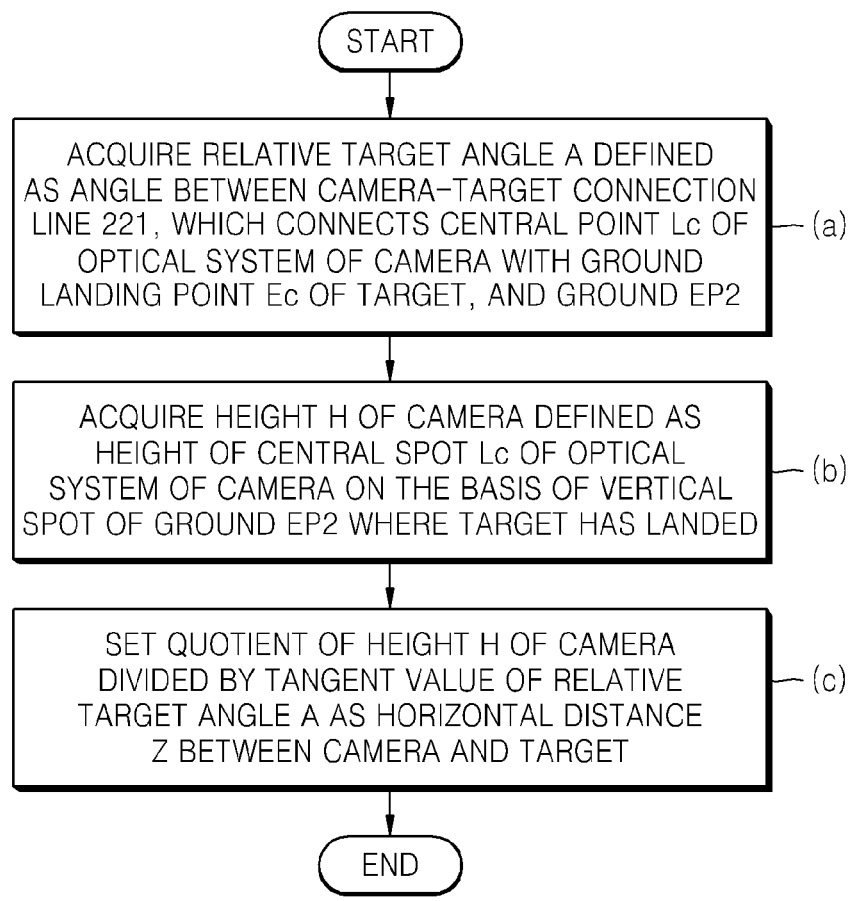
FIG. 3 is a flowchart illustrating a method performed in a host device the camera surveillance system of FIG. 1 according to an exemplary embodiment.

FIG. 3 illustrates a method performed in a host device 13, of each camera 101 to 121 or the camera surveillance system of FIG. 1, according to an exemplary embodiment. For example, the host device 13 of one camera 101 to 121 or the camera surveillance system of FIG. 1, acquires a horizontal distance z between the camera 101 and a target defined as the horizontal distance between the central point Lc of the optical system 201 of each camera 101 to 121 and the ground landing point Ec of the target according to the method of FIG. 3.

Referring to FIGS. 2 and 3, a method of an exemplary embodiment of is as follows. The method of the exemplary embodiment includes steps (a) to (c).

In step (a), the host device 13 of the camera 101 or the camera surveillance system, acquires a relative target angle α as an angle between a camera-target connection line 221, which connects the central point Lc of the optical system 201 of the camera 101 with the ground landing point Ec of the target 211, and the ground EP2.

The relative target angle α may be calculated from the setting values of the parameters of the camera 101. This will be described in detail with reference to FIGS. 4 to 10.

In step (b), the host device 13 of the camera 101 or the camera surveillance system, acquires the height H of the camera as the height of the central point Lc of the optical system 201 of the camera 101 on the basis of the vertical point of the ground where the target 211 has landed.

The height H of the camera 101 is a value set by a user who installs the camera 101.

In step (c), the host device 13 of the camera 101 or the camera surveillance system, sets the quotient of the height H of the camera, divided by the tangent value (tan-1α) of the relative target angle α as the horizontal distance z between the camera 101 and the target 211. In other words, the horizontal distance z between the camera 101 and the target 211 is determined using Equation 3 below:

$$z = \frac{H}{\tan\alpha} \quad \text{[Equation 3]}$$

According to a camera 101 and camera surveillance system adopting the method of the present embodiment, it is possible to acquire a horizontal distance z between one camera 101 and a target 211 using only one camera 101.

As such, the method of the exemplary embodiments has the following effects, in comparison to the related art laser sensor camera.

First, in the exemplary embodiments, additional costs for using a laser sensor camera are saved.

Second, in the exemplary embodiments, a horizontal distance, not a straight line distance, between a camera and a target, can be quickly acquired.

Further, the exemplary embodiments have the following effects, in comparison to the related art of using two or more adjacent cameras.

First, in the exemplary embodiments, only one camera in one area is needed to take pictures of a target to obtain moving pictures. Therefore, the costs for additional cameras are saved.

Second, in the exemplary embodiments, a horizontal distance is quickly obtained by a simple calculation. Therefore, an accurate result can be used. For example, it is possible to accurately display, in real time, a distance between a car moving with fast speed and a camera.

Hereinafter, the above step (a) will be described in detail with reference to FIGS. 4 to 10.

Figure 4:
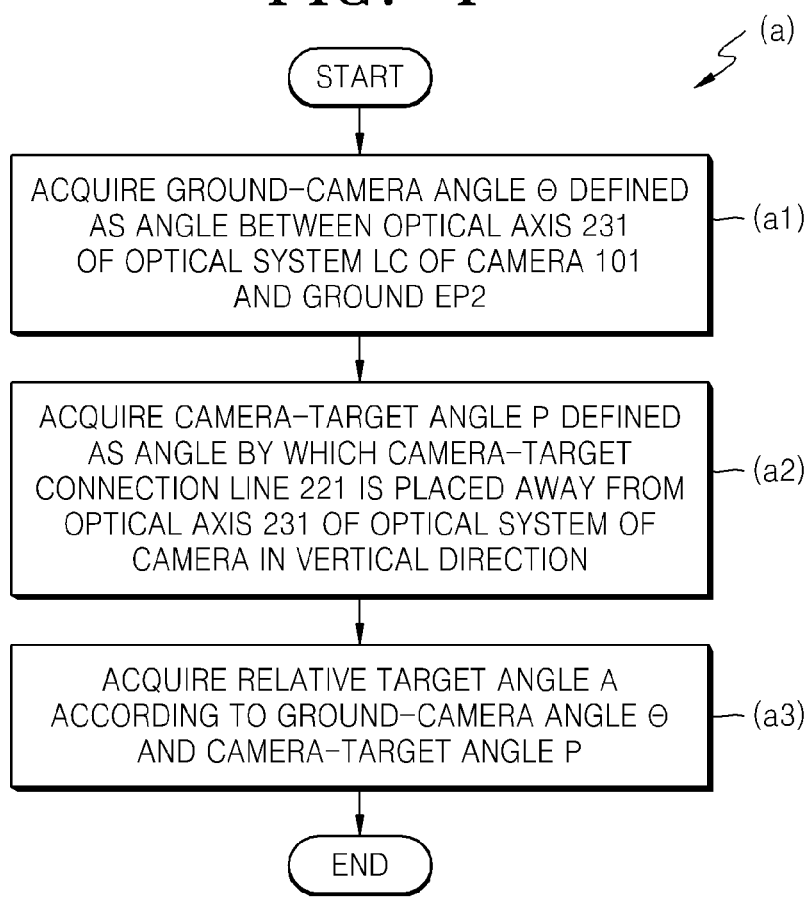
FIG. 4 is a flowchart illustrating in detail step (a) of FIG. 3.

FIG. 4 illustrates step (a) of FIG. 3.

Figure 6:
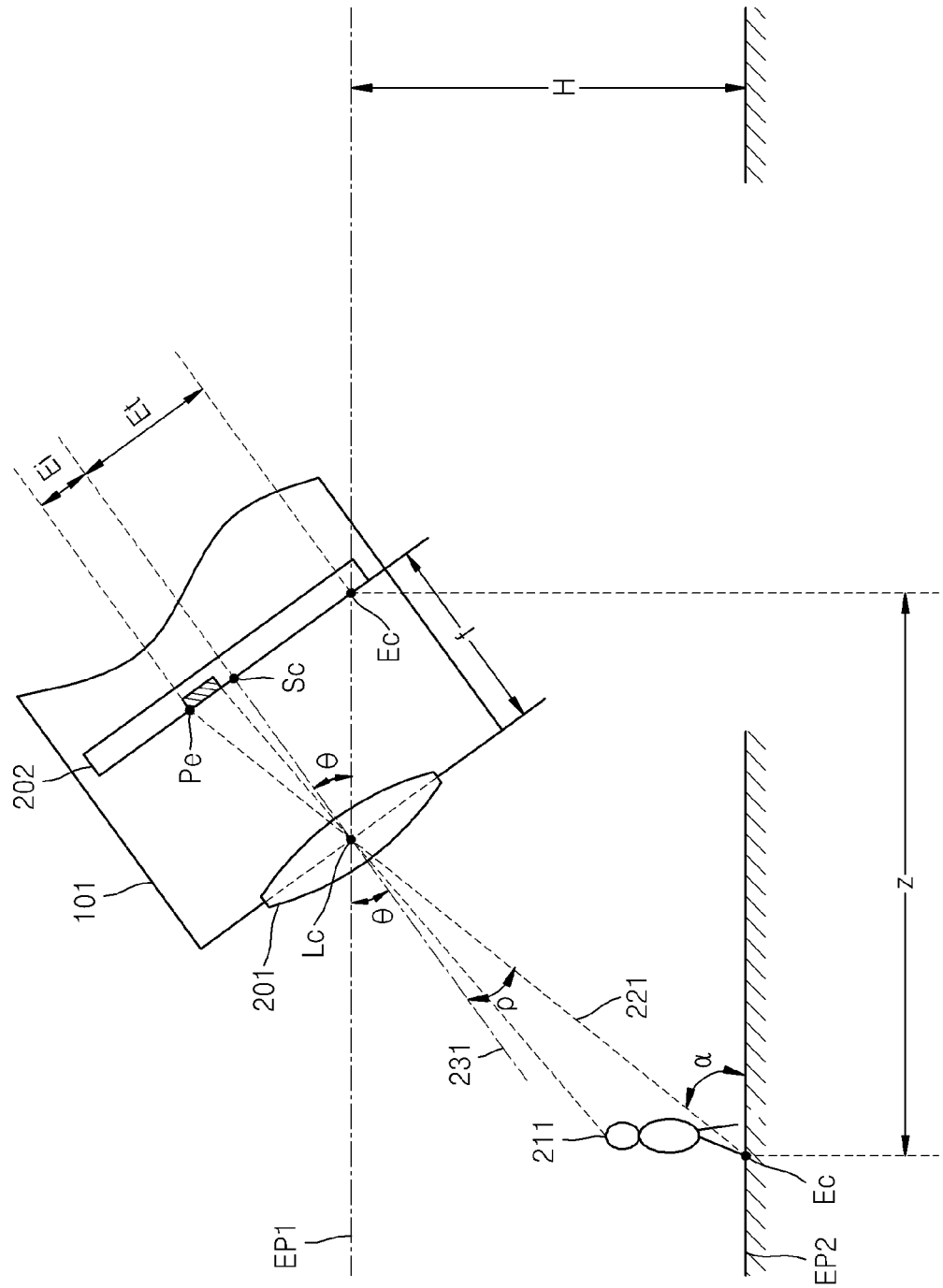
FIG. 6 is a second view illustrating a method according to an exemplary embodiment.

FIG. 6 is a second view illustrating a method according to an exemplary embodiment. In FIG. 6, the same reference number as in FIG. 2 refers to the same object. In FIG. 6, Ec denotes a sensor horizontal point, Et denotes a sensor tilting distance, θ denotes a ground-camera angle, and ρ denotes a camera-target angle. In the case of the second view of FIG. 6, the ground-camera angle θ does not redundantly include the camera-target angle ρ, and the camera-target angle ρ does not redundantly include the ground-camera angle θ.

Figure 7:
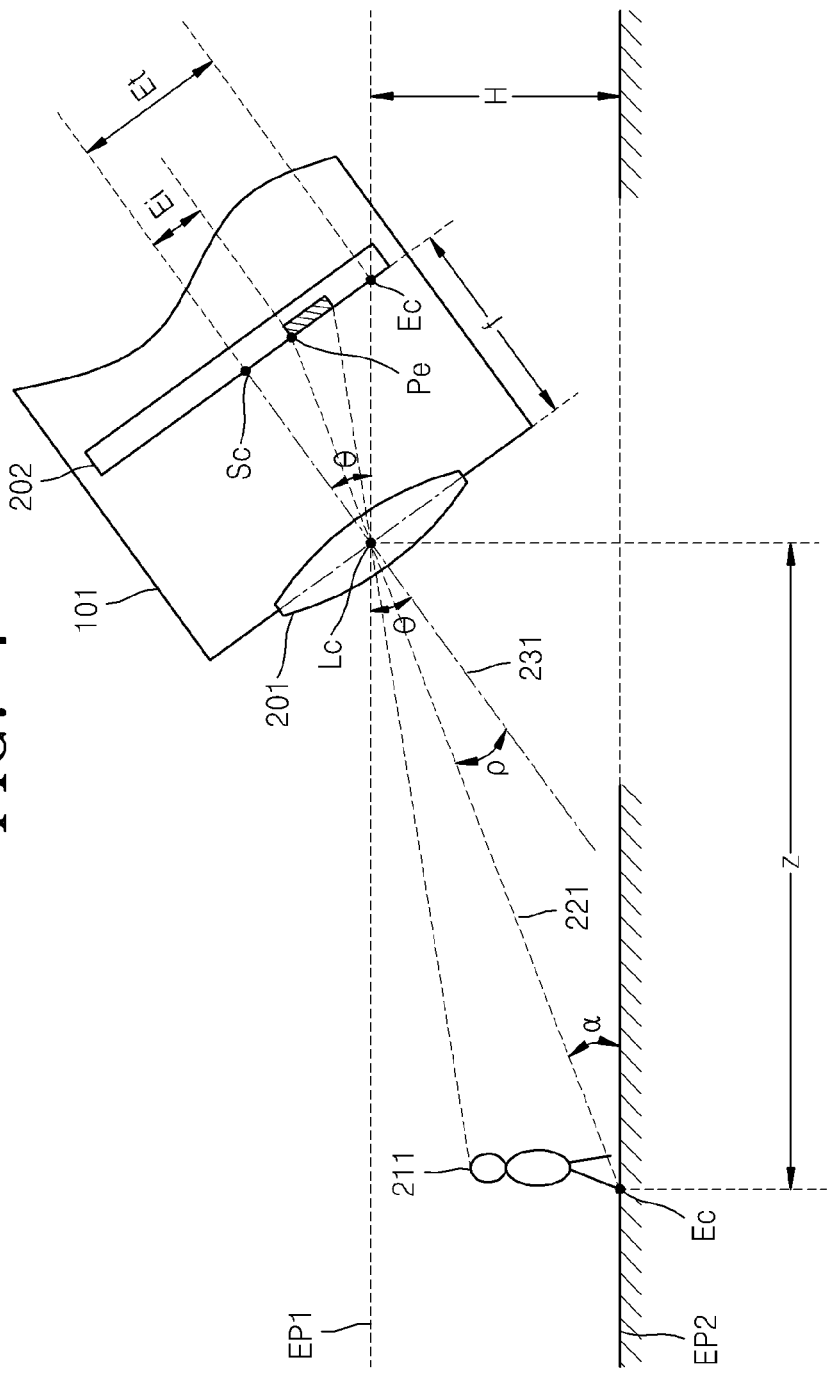
FIG. 7 is a third view illustrating a method according to an exemplary embodiment.

FIG. 7 is a third view illustrating a method according to an exemplary embodiment. In FIG. 7, the same reference number as in FIG. 6 refers to the same object. In the case of the third view of FIG. 7, the ground-camera angle θ redundantly includes the camera-target angle ρ.

Figure 8:
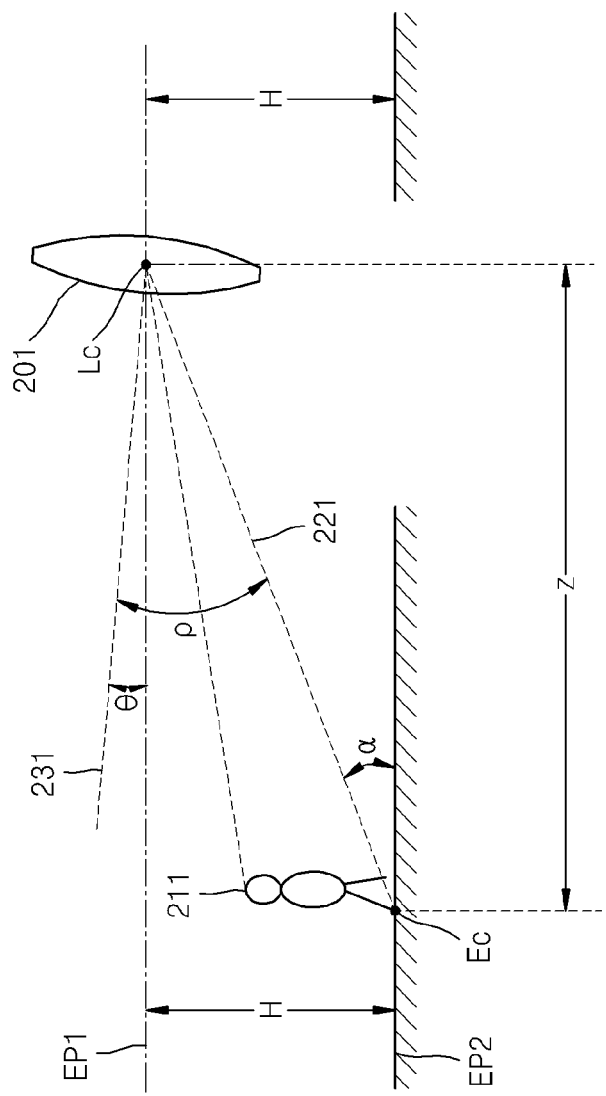
FIG. 8 is a fourth view illustrating a method according to an exemplary embodiment.

FIG. 8 is a fourth view illustrating a method according to an exemplary embodiment. In FIG. 8, the same reference number as in FIG. 6 refers to the same object. In the case of the fourth view of FIG. 8, the camera-target angle ρ redundantly includes the ground-camera angle θ.

As illustrated above, in the case of the first view of FIG. 3, the camera 101 is parallel to the ground EP2. Thus, the ground-camera angle θ is 0.

Hereinafter, step (a) of FIG. 3 will be described in detail with reference to FIGS. 2, 4, and 6 to 8. Step (a) includes steps (a1) to (a3).

In step (a1), the host device (13 of FIG. 1) of the camera 101 or the camera surveillance system, acquires the ground-camera angle θ defined as the angle between the optical axis 231 of the optical system Lc of the camera 101 and the ground EP2.

For example, the tilting angle obtained by the tilting control of the camera 101 may be set as the ground-camera angle θ. The case where the tilting angle is not promptly acquired will be described later, I with reference to step (a1) of FIG. 9.

In step (a2), the host device 13 of the camera 101 or the surveillance system, acquires the camera-target angle ρ defined as the angle between the camera-target connection line 221 and the optical axis 231 of the optical system 201 of the camera in a vertical direction. Step (a2) will be described later, with reference to FIG. 10.

In step (a3), the host device 13 of the camera 101 or the surveillance system, acquires the relative target angle α according to the ground-camera angle θ and the camera-target angle ρ. Hereinafter, step (a3) will be described in detail with reference to FIG. 5.

Figure 5:
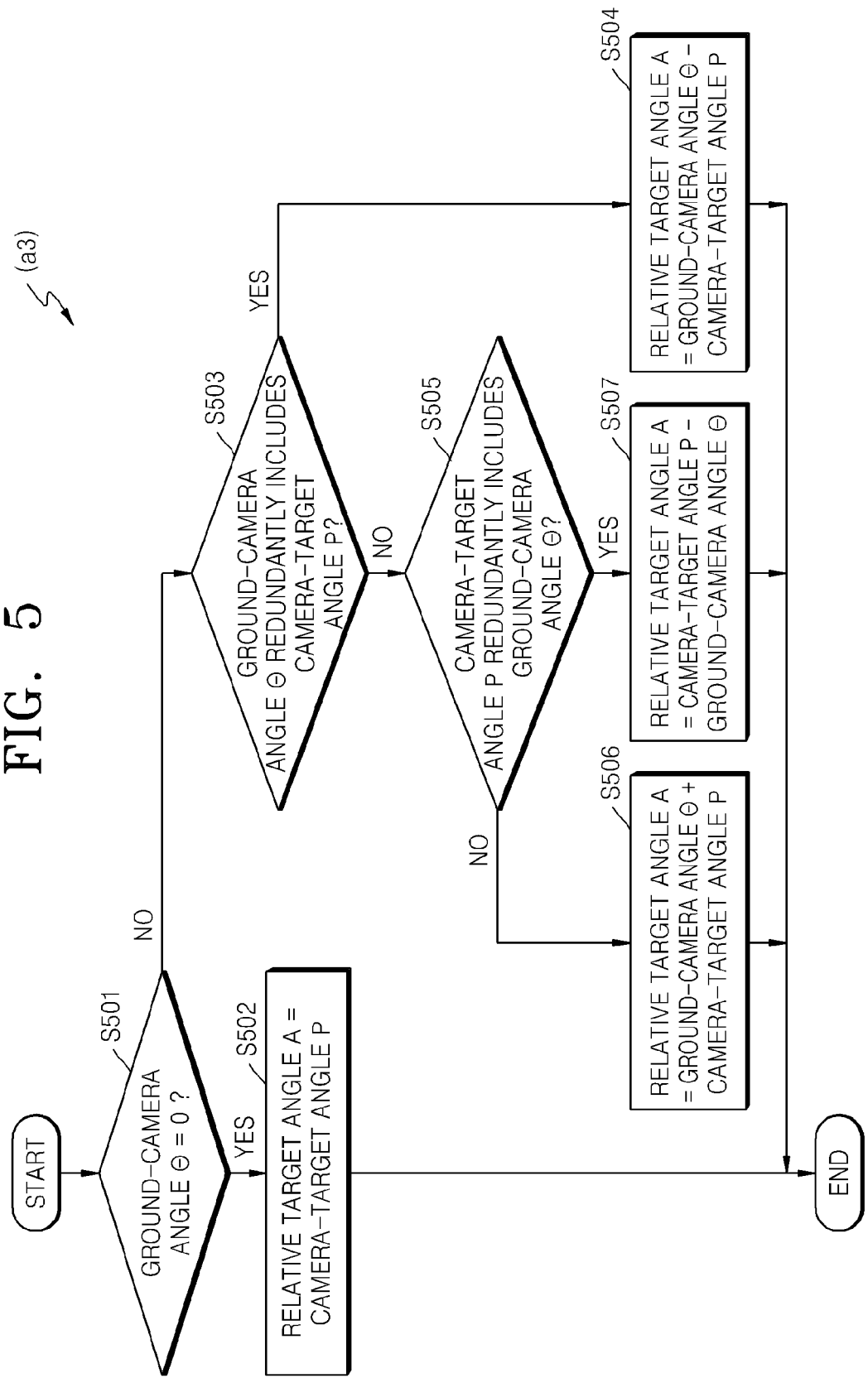
FIG. 5 is a flowchart illustrating in detail step (a3) of FIG. 4.

FIG. 5 illustrates step (a3) of FIG. 4 in detail.

Step (a3) of FIG. 4 will be described below, with reference to FIGS. 2, 5 and 6 to 8. Step (a3) includes steps S501 to S507.

First, the host device 13 of the camera 101 or the camera surveillance system, determines whether the ground-camera angle θ is 0 when the camera is parallel to the ground (S501).

If the ground-camera angle θ is 0, i.e., in the case of the first view of FIG. 2, the host device 13 of the camera or the camera surveillance system, sets the camera-target angle ρ as the relative target angle α (S502). In other words, in the case of the first view of FIG. 2, Equation 4 below is applied:

α=ρ     [Equation 4]

If the ground-camera angle θ is not 0, i.e., in the case of the second view of FIG. 6, the third view of FIG. 7, or the fourth view of FIG. 8, steps S503 to S507 are performed.

The host device 13 of the camera 101 or the camera surveillance system, determines whether the ground-camera angle θ redundantly includes the camera-target angle ρ (S503).

If the ground-camera angle θ redundantly includes the camera-target angle ρ, i.e., in the case of the third view of FIG. 7, the host device 13 of the camera 101 or the camera surveillance system, sets the result of the ground-camera angle θ minus the camera-target angle ρ as the relative target angle α (S504). In other words, in the case of the third view of FIG. 7, Equation 5 below is applied:

α=θ-ρ     [Equation 5]

If the ground-camera angle θ does not redundantly include the camera-target angle ρ, i.e., in the case of the second view of FIG. 6 or the fourth view of FIG. 8, steps S505 to S507 are performed.

The host device 13 of the camera 101 or the camera surveillance system, determines whether the camera-target angle ρ redundantly includes the ground-camera angle θ (S505).

If the camera-target angle ρ redundantly includes the ground-camera angle θ, i.e., in the case of the fourth view of FIG. 8, the host device 13 of the camera 101 or the camera surveillance system, sets the relative target angle α (S507) as the camera-target angle ρ minus the ground-camera angle θ. In other words, in the case of the fourth view of FIG. 8, Equation 6 below is applied:

α=ρ-θ     [Equation 6]

If the ground-camera angle θ does not redundantly include the camera-target angle ρ, and the camera-target angle ρ does not redundantly include the ground-camera angle θ, i.e., in the case of the second view of FIG. 6, the host device 13 of the camera 101 or the camera surveillance system, sets the relative target angle α as the ground-camera angle θ plus the camera-target angle ρ (S506).

FIG. 9 illustrates detailed step (a1) of FIG. 4, in the case where the tilting angle of the camera 101 is not promptly acquired.

Step (a1) of FIG. 4, in the case where the tilting angle of the camera 101 is not promptly acquired, will be described in detail with reference to FIGS. 6, 7 and 9. Step (a1) includes steps (a11) to (a14).

In step (a11), if the optical axis 231 of the optical system 201 of the camera 101 is extended toward the photoelectric conversion device 202 in a straight line, the host device (reference numeral 13 of FIG. 1) of the camera or the surveillance system acquires the vertical coordinates of the sensor central point Sc defined as the point where the extended optical axis reaches the optical conversion device 202.

In step (a12), if a straight line parallel to the ground is extended to the central point Lc of the optical system 201 of the camera, the host device 13 of the camera 101 or the surveillance system acquires the vertical coordinates of the sensor horizontal point Ec, defined as the point where the extended line reaches the photoelectric conversion device 202. The vertical coordinates of the sensor central point Ec may be promptly acquired, according to the horizontal level of the camera 101.

In step (a13), the host device 13 of the camera 101 or the surveillance system acquires a sensor tilting distance Et, which is the vertical distance between the sensor central point Sc and the sensor horizontal point Ec.

In step (a14), the host device 13 of the camera 101 or the surveillance system acquires the quotient of the sensor tilting distance Et divided by the focal distance f of the optical system, and sets the arctangent value of the quotient as the ground-camera angle θ.

In other words, in step (a1) of FIG. 4, in the case where the tilting angle of the camera 101 is not promptly acquired, Equation 7 below is applied:

$$\theta = \tan^{-1}\frac{Et}{f}$$     [Equation 7]

FIG. 10 illustrates step (a2) of FIG. 4 in detail.

Hereinafter, step (a2) of FIG. 4 will be described, with reference to FIGS. 6, 7 and 10. Step (a2) includes steps (a21) to (a24).

In step (a21), if the optical axis 231, of the optical system 201 of the camera 101, is extended toward the photoelectric conversion device 202 in a straight line, the host device (reference numeral 13 of FIG. 1) of the camera 101 or the surveillance system, acquires the vertical coordinates of the sensor central point Sc, defined as the point where the extended optical axis reaches the optical conversion device 202.

In step (a22), if the camera-target connection line 221 is extended toward the photoelectric conversion device in a straight line, the host device 13 of the camera 101 or the surveillance system, acquires the vertical coordinates of the target-image landing point Pe, defined as the point where the extended line reaches the photoelectric conversion device 202. The point where the target image is combined with the ground (or floor) image is set as the target-image landing point Pe.

In step (a23), the host device 13 of the camera 101 or the surveillance system acquires the image vertical distance Ei, which is the vertical distance between the sensor central point Sc and the target-image landing point Pe.

Further, in step (a24), the host device of the camera 101 or the surveillance system, acquires the quotient of the image vertical distance E1 divided by the focal distance f of the optical system 201, and sets the arctangent value of the quotient as the camera-target angle ρ.

In other words, in step (a2) of FIG. 4, Equation 8 below is applied:

$$\rho = \tan^{-1}\frac{Ei}{f}$$     [Equation 8]

As illustrated above, in a method of acquiring a horizontal distance between a camera and a target, and a camera and camera surveillance system adopting the method according to the exemplary embodiments, the quotient of the height of the camera divided by the tangent value of the relative target angle is equal to the horizontal distance between the camera and the target.

The relative target angle may be calculated from the setting values of the parameters of the camera. The height of the camera is a value set by the user.

In an experiment to check the effects of the exemplary embodiments, a person at 0.13 meters from the camera 101 has been photographed, as shown in FIG. 6.

Four parameters are used, which may include the height H of the camera being 0.97 meters, the value of the vertical coordinates of the target-image landing point Pe being 110 pixels, the focal distance f being 1,550 pixels, and the tilting angle being 2O.

As presented above, the tilting angel acquired by controlling tilting of the camera, may be used as the ground-camera angle θ. Further, if the vertical coordinates of the sensor central point Sc has been set to 0, the vertical distance Ei between the sensor central point Sc and the target-image landing point Pe is the same as the value of the vertical coordinates of the target-image landing point Pe.

Hence, the camera-target angle ρ is tan−1(110/1550), which is about 4.06O, the relative target angle α is 2O+4.06O, which is about 6.06O, and the tangent value of the relative target angle α is tan 6.06O, which is about 0.106.

Therefore, the horizontal distance z between the camera and the target is 0.97/0.106, i.e., about 9.15 meters, which is very close to the actual horizontal distance z, i.e., 9.13 meters.

Likewise, a horizontal distance, between the camera and the target, may be quickly acquired using only one camera.

As such, the exemplary embodiments have the following effects, in comparison to the related art, adopting a laser sensor to a camera.

First, in the exemplary embodiments, additional costs for using a laser sensor camera are saved.

Second, in the exemplary embodiments, a horizontal distance, not a straight line distance, between a camera and a target can be quickly acquired.

Further, the exemplary embodiments have the following effects, in comparison to the related art of using two or more adjacent cameras.

First, in the exemplary embodiments, only one camera is needed in one area to take pictures of a target in order to obtain moving pictures. Thus, the costs for additional cameras are saved.

Second, in the exemplary embodiments, a horizontal distance is quickly obtained by a simple calculation. Thus, an accurate result can be used. For example, it is possible to accurately display in real time a distance of a car passing by at fast speed.

While the exemplary embodiments have been particularly shown and described, it will be understood by those of ordinary skill in the art that various changes in form and details may be made therein, without departing from the spirit and scope of the exemplary embodiments as defined by the following claims.

What is claimed is:

1. A method of acquiring a horizontal distance between a camera including an optical system and a photoelectric conversion device and a target, which is a horizontal distance between a central point of the optical system of the camera and a ground landing point of the target, the method comprising:
    acquiring a relative target angle, which is an angle between a ground and a camera-target connection line which connects the central point of the optical system of the camera and the ground landing point of the target;
    acquiring a height of the camera which is a height of the central point of the optical system of the camera on a basis of a vertical position of the ground landing point of the target; and
    setting a quotient of the height of the camera divided by a tangent value of the relative target angle as the horizontal distance between the camera and the target,
    wherein the camera-target connection line is different from the optical axis, and
    wherein the acquiring the relative target angle comprises:
    calculating a ground-camera angle which is an angle between the ground and the optical axis of the camera, based on a focal distance of the optical system and a sensor tilting distance that is a vertical distance between a sensor central point and a sensor horizontal point, the sensor central point being a point where the optical axis reaches the photoelectric conversion device of the camera and the sensor horizontal point being a point where an extended line from a straight line parallel to the ground reaches the photoelectric conversion device;
    calculating a camera-target angle which is an angle between the camera-target connection line and the optical axis of the camera, based on the focal distance of the optical system and an image vertical distance that is a vertical distance between a sensor central point and a target-image landing point, the target-image landing point being a point where the camera-target connection line reaches the photoelectric conversion device; and
    calculating the relative target angle based on the ground-camera angle and the camera-target angle.

2. The method of claim 1, wherein a tilting angle acquired in a tilting control of the camera is set as the ground-camera angle.

3. The method of claim 1, wherein, when the optical axis of the camera is parallel to the ground, the camera-target angle is set as the relative target angle.

4. The method of claim 1, wherein, if the ground-camera angle includes the camera-target angle, the relative target angle is equal to the ground-camera angle minus the camera-target angle.

5. The method of claim 1, wherein, if the camera-target angle includes the ground-camera angle, the relative target angle is equal to the camera-target angle minus the ground-camera angle.

6. The method of claim 1, wherein, if the ground-camera angle does not include the camera-target angle, and the camera-target angle does not include the ground-camera angle, the relative target angle is equal to the ground-camera angle minus the camera-target angle.

7. The method of claim 1,
    wherein the acquiring the ground-camera angle comprises:
    acquiring a vertical coordinate of sensor central point;
    acquiring a vertical coordinate of the sensor horizontal point;
    acquiring the sensor tilting distance; and
    acquiring a quotient of the sensor tilting distance divided by the focal distance of the optical system, and setting an arctangent value of the quotient as the ground-camera angle.

8. The method of claim 1,
    wherein the acquiring the camera-target angle comprises:
    acquiring a vertical coordinate of the sensor central point;

acquiring a vertical coordinate of the target-image landing point;

acquiring the image vertical distance; and acquiring a quotient of the image vertical distance divided by the focal distance of the optical system, and setting an arctangent value of the quotient as the camera-target angle.

9. A camera for acquiring a horizontal distance between the camera and a target, which is a horizontal distance between a central point of an optical system of the camera and a ground landing point, wherein the camera includes an optical system and a photoelectric conversion device, wherein the camera is configured to acquire a relative target angle, which is an angle between ground and a camera-target connection line which connects the central point of the optical system of the camera and the ground landing point of the target, acquire a height of the camera which is a height of the central point of the optical system of the camera on a basis of a vertical position of the ground landing point of the target, and set a quotient of the height of the camera divided by a tangent value of the relative target angle as a horizontal distance between the camera and the target, wherein the camera-target connection line is different from the optical axis, and wherein the camera is further configured to acquire the relative target angle by calculating a ground-camera angle which is an angle between the ground and the optical axis of the camera, based on a focal distance of the optical system and a sensor tilting distance that is a vertical distance between a sensor central point and a sensor horizontal point, the sensor central point being a point where the optical axis reaches the photoelectric conversion device of the camera and the sensor horizontal point being a point where an extended line from a straight line parallel to the ground reaches the photoelectric conversion device;

calculating a camera-target angle which is an angle between the camera-target connection line and the optical axis of the camera, based on the focal distance of the optical system and an image vertical distance that is a vertical distance between a sensor central point and a target-image landing point, the target-image landing point being a point where the camera-target connection line reaches the photoelectric conversion device; and calculating the relative target angle based on the ground-camera angle and the camera-target angle.

10. A surveillance system comprising:

a camera including an optical system and a photoelectric conversion device; and a host device connected to camera, the host device acquiring a horizontal distance between the camera and a target which is a horizontal distance between a central point of an optical system of the camera and a ground landing point of the target, wherein the host device is configured to acquire a relative target angle, which is an angle between ground and a camera-target connection line which connects the central point of the optical system of the camera and the ground landing point of the target, acquire a height of the camera which is a height of the central point of the optical system of the camera on a basis of a vertical position of the ground landing point of the target, and set a quotient of the height of the camera divided by a tangent value of the relative target angle as the horizontal distance between the camera and the target, wherein the camera-target connection line is different from the optical axis, and wherein the host device is further configured to acquire the relative target angle by calculating a ground-camera angle which is an angle between the ground and the optical axis of the camera, based on a focal distance of the optical system and a sensor tilting distance that is a vertical distance between a sensor central point and a sensor horizontal point, the sensor central point being a point where the optical axis reaches the photoelectric conversion device of the camera and the sensor horizontal point being a point where an extended line from a straight line parallel to the ground reaches the photoelectric conversion device;

calculating a camera-target angle which is an angle between the camera-target connection line and the optical axis of the camera, based on the focal distance of the optical system and an image vertical distance that is a vertical distance between a sensor central point and a target-image landing point, the target-image landing point being a point where the camera-target connection line reaches the photoelectric conversion device; and calculating the relative target angle based on the ground-camera angle and the camera-target angle.

\* \* \* \* \*